March 10, 1925.

A. R. GROSS 1,529,429

DASH SWITCH

Filed Sept. 23, 1924

Inventor:
Angus R. Gross
By Alexander Lowell
Attorneys.

Patented Mar. 10, 1925.

1,529,429

UNITED STATES PATENT OFFICE.

ANGUS R. GROSS, OF BALTIMORE, MARYLAND.

DASH SWITCH.

Application filed September 23, 1924. Serial No. 739,382.

*To all whom it may concern:*

Be it known that I, ANGUS R. GROSS, a citizen of the United States, residing at Baltimore, in the county of Baltimore and State of Maryland, have invented certain new and useful Improvements in Dash Switches; and I hereby declare that the following is a full, clear, and exact description thereof, reference being had to the accompanying drawings, which form part of this specification.

This invention is a novel improvement in dash-switches, which are usually attached to or mounted on the dash-board of an automobile, or like vehicle, and are used particularly for controlling the parking light, or other minor electrical equipment features of the automobile or vehicle.

The object of the invention is to provide a simple, compact, and efficient dash-switch, which can be readily attached to the dash-board; which will be inconspicuous when so attached, and can be readily operated by a slight push or pull; and will not be readily affected by the jarring of the vehicle to which such switches are necessarily subjected.

I will explain the invention with reference to the accompanying drawing which illustrates one practical embodiment thereof to enable others to adopt and use the same, and will summarize in the claims the novel features of construction, and novel combinations of parts for which protection is desired.

Figure 1:
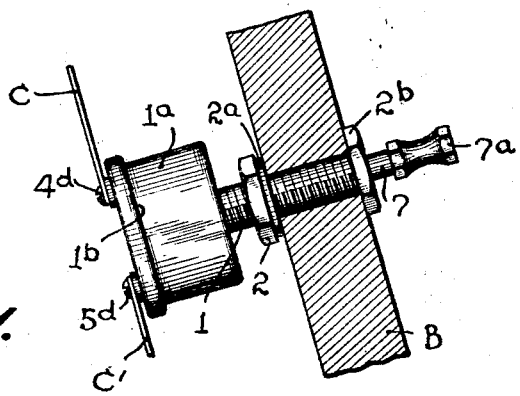
Figure 1 is a side view of the switch attached to the dash board of an automobile or other vehicle.

The switch, as shown in the drawing, comprises a tubular supporting member 1, preferably made of brass, said member being exteriorly threaded throughout its length, and having an enlarged cup-shaped head 1ª at one end thereof, which head is preferably riveted to the end of said tubular member, or may be secured thereto in any other desired manner. The head 1ª is preferably co-axial with the tubular member 1, and the interior thereof communicates with the bore 1ᶜ of the tubular threaded member 1.

On the threaded member 1 is an adjustable setting nut 2, a lock-washer 2ª, and at the end of the member 1 opposite the head 1ª is a clamping nut 2ᵇ by which the member 1 may be inserted in a suitable hole bored into the dash-board B of the vehicle and fastened thereto.

Attached to the outer end of the cup-shaped head 1ª is an insulating plate 3, preferably made of fibre, bakelite, hard rubber, or other insulating material. Plate 3 is shaped to conform with the outer end of the head 1ª, and is adapted to seat on an annular shoulder 1ᵇ pressed or otherwise formed in the outer end of said head, and when the plate 3 has been inserted into place against the shoulder 1ᵇ, the outer periphery of the head may then be bent slightly inwardly around the plate 3 to securely hold the plate 3 against the shoulder 1ᵇ thereby closing the outer end of said head.

Figure 2:
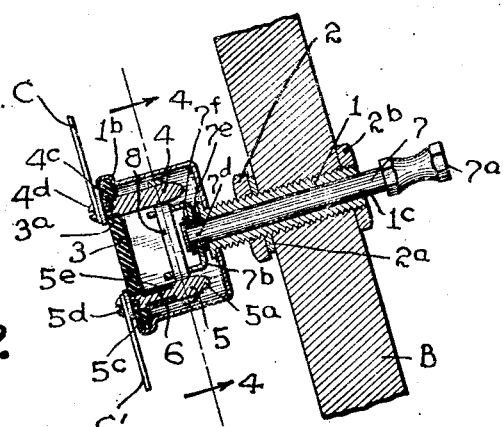
Figure 2 is a longitudinal section through such switch in "closed" position.

Mounted upon the plate 3, within the head 1ª and disposed upon the longitudinal axis of the switch, are contact posts 4 and 5, preferably spaced equi-distant from and parallel with the axis of the bore 1ᶜ. Contact posts 4 and 5 extend into the cup-shaped head 1ª approximately three-fourths the length thereof, and preferably comprise cylindrical rods, of brass or other conducting material, having their outer ends rounded as at 4ª, 5ª, (Fig. 2). The inner ends of the posts 4 and 5 are preferably reduced as at 4ᵇ, 4ᵇ, and are passed through perforations 3ª in the plate 3, and the outer extremities of the reduced portions 4ᵇ, 5ᵇ, are then riveted against the outer face of the plate 3 to securely bind the posts 4 and 5 to the insulating plate 3. The posts 4 and 5 however may be secured to the insulating plate 3 in any other desired manner.

The exposed reduced ends 4ᵇ, 5ᵇ, of the contacts 4 and 5 are tapped as at 4ᶜ, 5ᶜ, to receive screws 4ᵈ, 5ᵈ, respectively, by which the electrical conductors C, C' of the electrical circuit may be connected to the contact posts 4 and 5. The conductors C, C' form part of an electrical circuit including a battery, parking light, or other electro-receptive devices, (not shown).

One of the posts, such as 5, is provided with an insulating collar 6, mounted upon the reduced portion 5ᵉ of the said post, which reduced portion extends from the plate 3 to a point approximately half the length of the said post. Collar 6 is preferably made of fibre or other insulating material, and is of same length as the reduced portion 5ᵉ, and of same exterior diameter as the post 5, so that when mounted thereon, the surface of the collar 6 will be flush with that of the post. If desired the collar 6 may be formed integral with the plate 3.

Through the bore 1ᶜ of member 1 extends a reciprocable rod 7, having on its outer end a "pull" or finger nut 7ᵃ of any suitable kind and mounted thereon in any desired manner. On the inner end of rod 7 within the head 1ᵃ is a U-shaped member 7ᵇ, having its legs 7ᶜ disposed adjacent to the contact posts 4 and 5. Member 7ᵇ is preferably made of metal, and securely riveted onto the inner end of rod 7, but is insulated therefrom. As shown in Figure 2, the inner end of rod 7 is reduced as at 7ᵈ, to receive two perforated insulating washers 7ᵉ, 7ᶠ, of fiber, bakelite, hard rubber, or the like, between which washers the base of the U-shaped member 7ᵇ is clamped, said base having a perforation 7ᵍ therein of larger diameter than the perforations in the washers 7ᵉ, 7ᶠ, so that no portion of the member 7ᵇ will contact with rod 7. The end of rod 7 is riveted over the outer face of the outer washer 7ᶠ to securely bind the insulating washers and U-shaped member to rod 7.

Mounted in opposed slots or perforations 7ᵍ in the legs 7ᶜ of the U-shaped member 7ᵇ is a metallic band 8, which band is looped around the contact posts 4 and 5 and is reciprocably mounted thereon. Band 8 should be so disposed with relation to the member 7ᵇ that when the rod 7 is at the limit of its outward movement the band 8 will engage the outer exposed halves of the contact posts 4 and 5 and thereby establish an electrical circuit therebetween, but when the rod 7 at the limit of its inward movement, the band 8 will engage the inner exposed half of the contact post 4 and the insulating collar 6 on the inner half of contact post 5, whereby the electrical circuit between the contact posts 4 and 5, will be broken. The band 8 is hence reciprocated by the rod 7 upon the posts 4 and 5, but the friction between the band 8 and the posts 4 and 5 will be sufficient to maintain the band 8, and rod 7, in adjusted position against the jarring of the vehicle. Band 8 is made of any desired conducting material, preferably copper, and may be round or rectangular in cross section, or of any other desired shape, and by drawing the opposite portions of the band, intermediate the legs 7ᶜ, close together, the band can be made to approximately entirely encircle the contact posts 4 and 5, thereby giving a greater contact surface between the band and posts.

Figure 3:
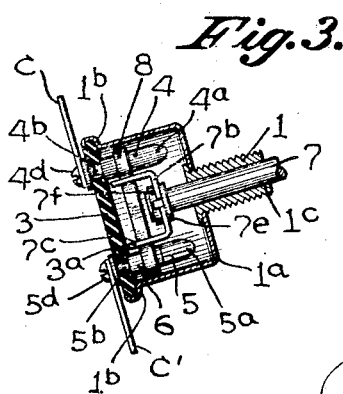
Figure 3 is a detail section showing the switch in "open" position.
Figure 4:
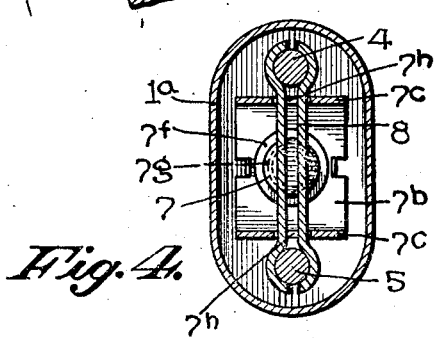
Figure 4 is an enlarged transverse section on the line 4—4, Figure 2.

When the rod 7 is pulled outwardly, as shown in Figure 2, the band 8 will engage the outer exposed ends of posts 4 and 5, and thus complete the electrical circuit between said posts, but when rod 7 is pushed inwardly, as shown in Figure 3, the band 8 will engage the post 4 and an insulating collar 6 on post 5, and hence the electrical circuit between posts 4 and 5 will be broken, by the interposition of the insulating collar 6.

The construction herein shown and described forms an efficient and reliable switch, in which the operative parts are thoroughly protected from dust, air, and water. The switch is easily attachable to the dashboard or other part of the vehicle, by first making a small hole in the dash board at the point where it is desired to locate the switch; then the nut 2 is adjusted until it is separated from nut 2ᵇ slightly more than the thickness of the material of the dash board, then nut 2ᵇ is removed and the small end of member 1 is inserted through the above hole; then nut 2ᵇ is replaced on the member 1 and tightened to securely clamp the body of the dashboard B between nuts 2 and 2ᵇ, thereby firmly securing the switch in position. The threaded member 1 is sufficiently long to permit the switch being readily mounted on any dash board, either of wood or metal, and when so mounted thereon only the nut 2ᵇ and the finger nut 7ᵃ are visible.

I do not limit my invention to the exact form shown in the drawing, for obviously, minor changes may be made in the various members of the switch, within the scope of the invention, nor do I limit my invention to the specific use herein mentioned.

I claim—

1. In an electric switch, a pair of parallel contact posts; an insulating collar on one of said posts; a conducting member reciprocably engaging said posts; and means for reciprocating said member, whereby the electrical circuit between the posts will be made or broken.

2. In an electric switch, a pair of parallel contact posts; an insulating collar on one of said posts adjacent its lower end; a conducting member reciprocably mounted upon said posts; and means for reciprocating said member, whereby the electrical circuit between the posts will be made or broken.

3. In an electric switch, a pair of parallel contact posts; an insulating collar on the end of one of said posts and flush with surface thereof; a conducting member reciprocably mounted upon said posts; and means for reciprocating said member, whereby the electrical circuit between the posts will be made or broken.

4. In an electric switch, a pair of parallel contact posts; an insulating collar on one of said posts; a conducting member having loops reciprocably engaging said posts, and means for reciprocating said member, whereby the electrical circuit between the posts will be made or broken.

5. In an electric switch, a pair of cylindrical parallel contact posts; an insulating collar inset in one of said posts and extending approximately half the length of said post; a conducting member having loops reciprocably engaging said posts, said loops being less in width than half the length of said posts; and means for reciprocating said member, whereby the electrical circuit between the posts will be made or broken.

6. In an electric switch, a pair of parallel contact posts; an insulating collar inset in one of said posts; a conducting band looped around said posts and reciprocably engaging same; and means for reciprocating said band upon said posts, whereby the electrical circuit between posts will be made or broken.

7. In an electric switch, a pair of cylindrical parallel contact posts; an insulating collar inset in one of said posts and extending approximately half the length thereof; a conducting band looped around said posts and reciprocably engaging same; said band being less in width than half the length of said posts; and means for reciprocating said band upon said posts, whereby the electrical circuit between contacts will be made or broken.

8. An electric switch, comprising a support; a head on one end of said support; a pair of parallel contact posts in said head parallel with the axis of said support; and one of said contacts having an insulating member inset in one end; a conducting member reciprocably engaging said contacts; and a rod extending through said support and engaging said conducting member; whereby as said rod is reciprocated the conducting member will be moved to make or break the electrical circuit between contacts.

9. An electric switch, comprising a support; a hollow head on said support; a pair of cylindrical parallel contact posts mounted within said head; one of said posts having an insulating collar inset in one end; a conducting member having loops reciprocably engaging said posts; and a reciprocable rod extending through said support and engaging said member, whereby as the rod is reciprocated the member will be moved to make or break the electrical circuit between said posts.

10. An electric switch, comprising a support, a hollow head on said support; a pair of parallel contact posts mounted within said head; one of said posts having an insulating collar inset in one end; a conducting member having loops reciprocably engaging said posts, a reciprocable rod extending through said support; and a U-shaped member mounted on said rod, said U-shaped member having perforations in its legs for the reception of said conducting member, whereby as said rod is reciprocated the conducting member will be moved to make or break the electrical circuit between posts.

11. An electric switch, comprising a support, a hollow head on one end of said support and coaxial therewith; a pair of parallel contact posts mounted within said head and insulated therefrom; one of said posts having an insulating collar inset in one end; a conducting member having loops reciprocably engaging said posts, a reciprocable rod extending through said support; and a U-shaped member mounted on the inner end of said rod and insulated therefrom, said U-shaped member having opposed perforations in its legs for the reception of said conducting member, whereby as said rod is reciprocated the conducting member will be moved to make or break the electrical circuit between posts.

12. An electric switch of the character specified, comprising a supporting member; means for securing said member to a dashboard; a cup-shaped head on said support; an insulating plate at the outer end of said head; a pair of parallel contact posts mounted on said plate and disposed parallel to the axis of said supporting member; one of said posts having an insulating collar inset in one end; a conducting member having loops reciprocably engaging said posts; a rod extending through said supporting member; and a U-shaped member mounted on the inner end of said rod, said U-shaped member carrying the conducting member in opposed perforations in the legs thereof, whereby as said rod is reciprocated the conducting member will make or break the electrical circuit between said posts.

13. An electric switch of the character specified, comprising an externally threaded supporting member; means for securing said member to a dash board; a cup-shaped head on one end of said support; an insulating plate at the outer end of said head; a pair of parallel contact posts mounted on said plate and disposed parallel to the axis of said supporting member; one of said posts having an insulating collar inset in one end; a conducting member having loops reciprocably engaging said posts; a rod extending through said supporting member; and a U-shaped member mounted on the inner end of said rod and insulated therefrom, said U-shaped member carrying the conducting member in opposed perforations in the legs thereof, whereby as said rod is reciprocated the conducting member will make or break the electrical circuit between said posts.

14. An electric switch of the character specified, comprising an externally threaded member; nuts engaging the said member to secure it to a dash board; a cup-shaped head mounted on one end of said threaded member; an insulating plate mounted in the outer end of said head; a pair of parallel contact posts mounted on said plate and disposed parallel with the axis of said threaded member; an insulating collar inset in the end of one post and extending approximately half the length of said post; a metallic band looped around said posts and reciprocably engaging same; a reciprocable rod extending through said threaded member; and a U-shaped member mounted on the inner end of said rod, said U-shaped member carrying the conducting member in opposed slots in the legs thereof, whereby as said rod is reciprocated the band will make or break the electrical circuit between said posts.

15. An electric switch of the character specified, comprising an externally threaded member; nuts engaging the said member to secure it to a dash board; a cup-shaped head on one end of said threaded member and co-axial therewith; an insulating plate mounted in the outer end of said head; a pair of parallel contact posts mounted on said plate and disposed parallel to the axis of said threaded member; an insulating collar inset in the end of one post and extending approximately half the length of said post; a metallic band looped around said posts and reciprocably engaging same; said band being less in width than half the length of said posts; a reciprocable rod extending through said threaded member; and a U-shaped member mounted on the inner end of said rod and insulated therefrom, said U-shaped member carrying the conducting member in opposed slots in the legs thereof, whereby as said rod is reciprocated the band will make or break the electrical circuit between said posts.

In testimony that I claim the foregoing as my own, I affix my signature.

ANGUS R. GROSS.